United States Patent
Petruzzelli et al.

(10) Patent No.: US 8,626,097 B2
(45) Date of Patent: Jan. 7, 2014

(54) METHODS AND APPARATUS FOR IDENTIFYING SIGNAL DEGRADATION IN A RECEIVER

(75) Inventors: Edmund F. Petruzzelli, Centennial, CO (US); Joseph E. Tomko, Castle Rock, CO (US); Scott George Fillingim, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 365 days.

(21) Appl. No.: 12/941,428

(22) Filed: Nov. 8, 2010

(65) Prior Publication Data

US 2011/0159804 A1 Jun. 30, 2011

Related U.S. Application Data (60) Provisional application No. 61/291,045, filed on Dec. 30, 2009.

(51) Int. Cl.
*H04B 17/00* (2006.01)

(52) U.S. Cl.
USPC .............. 455/226.1; 455/226.2; 455/226.4; 455/3.02

(58) Field of Classification Search
USPC ............ 455/9, 7, 11, 12.1, 3.02, 3.06, 226.1, 455/226.2, 226.4, 505, 506, 427, 432.3, 455/414.3, 431, 67.11; 725/25–28; 370/316
See application file for complete search history.

(56) References Cited

U.S. PATENT DOCUMENTS

| | | | | |
|---|---|---|---|---|
| 5,669,063 | A * | 9/1997 | Brockel et al. | 455/506 |
| 5,946,603 | A * | 8/1999 | Ibanez-Meier et al. | 455/13.1 |
| 6,169,881 | B1 * | 1/2001 | Astrom et al. | 455/12.1 |
| 6,587,687 | B1 * | 7/2003 | Wiedeman | 455/428 |
| 6,785,292 | B1 * | 8/2004 | Vogel | 370/433 |
| 7,047,029 | B1 * | 5/2006 | Godwin et al. | 455/505 |
| 7,373,105 | B2 * | 5/2008 | Dybdal et al. | 455/13.4 |
| 7,380,259 | B1 * | 5/2008 | Schroeder | 725/35 |
| 2002/0142744 | A1 * | 10/2002 | Okanoue et al. | 455/226.1 |
| 2004/0110518 | A1 * | 6/2004 | Swift et al. | 455/501 |
| 2004/0239550 | A1 * | 12/2004 | Daly, Jr. | 342/26 B |
| 2010/0253785 | A1 * | 10/2010 | Kummer et al. | 348/192 |
| 2011/0088058 | A1 * | 4/2011 | Velazquez et al. | 725/33 |

* cited by examiner

*Primary Examiner* — Nay A Maung
*Assistant Examiner* — Angelica M Perez
(74) *Attorney, Agent, or Firm* — Seed IP Law Group PLLC (57) ABSTRACT

Described herein are systems, methods and apparatus for identifying signal degradation in a receiver. A process for identifying signal degradation includes determining a first signal strength of a signal received by the receiving device at a first time and determining a second signal strength of the received signal at a second time. The process further includes calculating a signal strength difference between the first signal strength and the second signal strength and determining whether the signal strength difference is greater than a first decision value. The process further includes outputting for presentation a message responsive to determining that the signal strength difference is greater than the first decision value, the message indicating to a user the degradation of the signal.

25 Claims, 5 Drawing Sheets

METHODS AND APPARATUS FOR IDENTIFYING SIGNAL DEGRADATION IN A RECEIVER

RELATED APPLICATIONS

This application claims priority to U.S. patent application Ser. No. 61/291,045, entitled "METHODS AND APPARATUS FOR IDENTIFYING SIGNAL DEGRADATION IN A RECEIVER", filed Dec. 30, 2009, which is hereby incorporated by reference in its entirety.

BACKGROUND

In transmission systems, interference of a signal may be caused by weather conditions and/or other factors. This interference may be of a short duration (e.g., several minutes) or may be of a longer duration (e.g., hours, days or longer), depending on the factors causing the interference. Further, some interference/signal loss may occur instantaneously, whereas other interference/signal loss may increase over a period of time. For example, in a satellite television broadcast system, rain may cause temporary outages in the reception of a signal. The strength of the signal may degrade over a period of time as a storm approaches the location of the receiving device. Eventually, the degradation of the signal may become great enough such that the satellite receiver is unable to continue receiving the signal. This may be contrasted with the situation in which the signal is lost by the satellite receiver instantaneously, such as when a physical object comes within the line of sight of the antenna.

Signal loss in a transmission system often leads to users calling a technical support hotline in order to report and/or seek a remedy for the signal loss. If the signal loss is caused by rain fade or other weather conditions, then the problem will typically work itself out once the storm moves on. This may occur while the user is on the phone with the technical support hotline, leading to an unnecessary call by the user. Thus, it would be desirable for a receiving device to be able to differentiate between various types of signal loss, allowing the user to be more adequately informed regarding the source of the problem.

BRIEF DESCRIPTION OF THE DRAWINGS

The same number represents the same element or same type of element in all drawings.

DETAILED DESCRIPTION OF THE DRAWINGS

Described herein are systems, methods and apparatus for detecting signal loss in a receiving device. More particularly, described herein are techniques for monitoring strength of a received signal to identify signal degradation occurring over a period of time. Periodic signal degradation may be differentiated from instantaneous signal losses/degradation so that a user may be adequately advised regarding the source of a signal loss/degradation.

One embodiment comprises a method for operating a receiving device. The method includes determining a first signal strength of a signal received by the receiving device at a first time and determining a second signal strength of the received signal at a second time. The method further includes calculating a signal strength difference between the first signal strength and the second signal strength and determining whether the signal strength difference is greater than a specified decision value. In at least one embodiment, the method may include calculating a signal strength gradient between the first and second times and determining whether the signal strength gradient is greater than the specified decision value. The method further includes outputting for presentation a message responsive to determining that the signal strength difference is greater than the specified decision value, the message indicating to a user the degradation of the signal.

Multiple forms of messages may be utilized according to the techniques described herein. For example, a traditional pop-up message that covers a portion of the screen may be utilized to provide information to a user. Full screen messages may also be utilized to provide information to a user. In at least one embodiment, an icon associated with particular information may be presented on the screen (e.g., along a lower corner of the screen). In at least one embodiment, an icon may be clickable such that a user may be provided with additional information upon actuating the icon. It is to be appreciated that any type of visible or audible presentation of information to a user may be utilized in accordance with the teachings described herein.

Further, in some embodiments, it may be useful to present a user with multiple messages as the signal degrades or is lost. For example, a message may be initially presented warning that loss of the signal at a future point is likely. If possible, the user may be able to take precautions in order to avoid the loss of the signal. In at least one embodiment, multiple warning messages may be presented to the user. A subsequent message may then be presented to the user if the signal is actually lost by the receiver.

Multiple signal strength samples of a signal may be utilized to detect signal degradation over a period of time. In at least one embodiment, signal strength samples within a single viewing/receiving session may be utilized to detect signal degradation/loss caused by rain, snow, hail and/or other weather conditions. For example, if the strength of a signal decreases over several minutes of time, then it is likely that a temporary weather condition is occurring. Thus, if the signal is subsequently lost shortly thereafter, then the cause of the signal loss may be attributed to the temporary weather condition and a user may be informed accordingly.

In at least one embodiment, multiple signal strength samples may be recorded over a longer period of time (e.g., days, weeks, months or years). If signal degradation is detected over a period of time, then the user may be warned about possible causes of the signal degradation. For example, foliage may grow in front of a satellite antenna over time. As the foliage grows larger, the signal degradation may increase. In accordance with one embodiment, the detection of signal degradation over a period of time may be utilized to provide a message instructing the user to remove the foliage from around the antenna, removing the cause of the signal degradation.

In at least one embodiment, a strength of a signal is sampled and recorded during the initial reception of the signal, e.g., when the signal is initially locked onto by the receiver. The initial signal strength represents a base value. At periodic intervals, the signal strength is sampled and the resulting value is recorded. Calculations may be performed to determine whether the signal strength is decreasing over time. Depending on the decrease of the signal strength over a period of time, a source for the signal degradation may be identified and presented to the user upon loss of the signal.

The techniques illustrated herein will be described in reference to a satellite communication network. More particularly, the techniques described herein are described in the context of a satellite television broadcast system. However, the techniques described herein are not limited to satellite television receivers and may be readily adapted and deployed in any type of wireless communication system. For example, mobile telephones, wireless internet systems, satellite radio, satellite transmitted internet protocol television (IPTV) systems, over-the-air (OTA) television and radio transmission systems may benefit from the techniques described herein.

Figure 1:
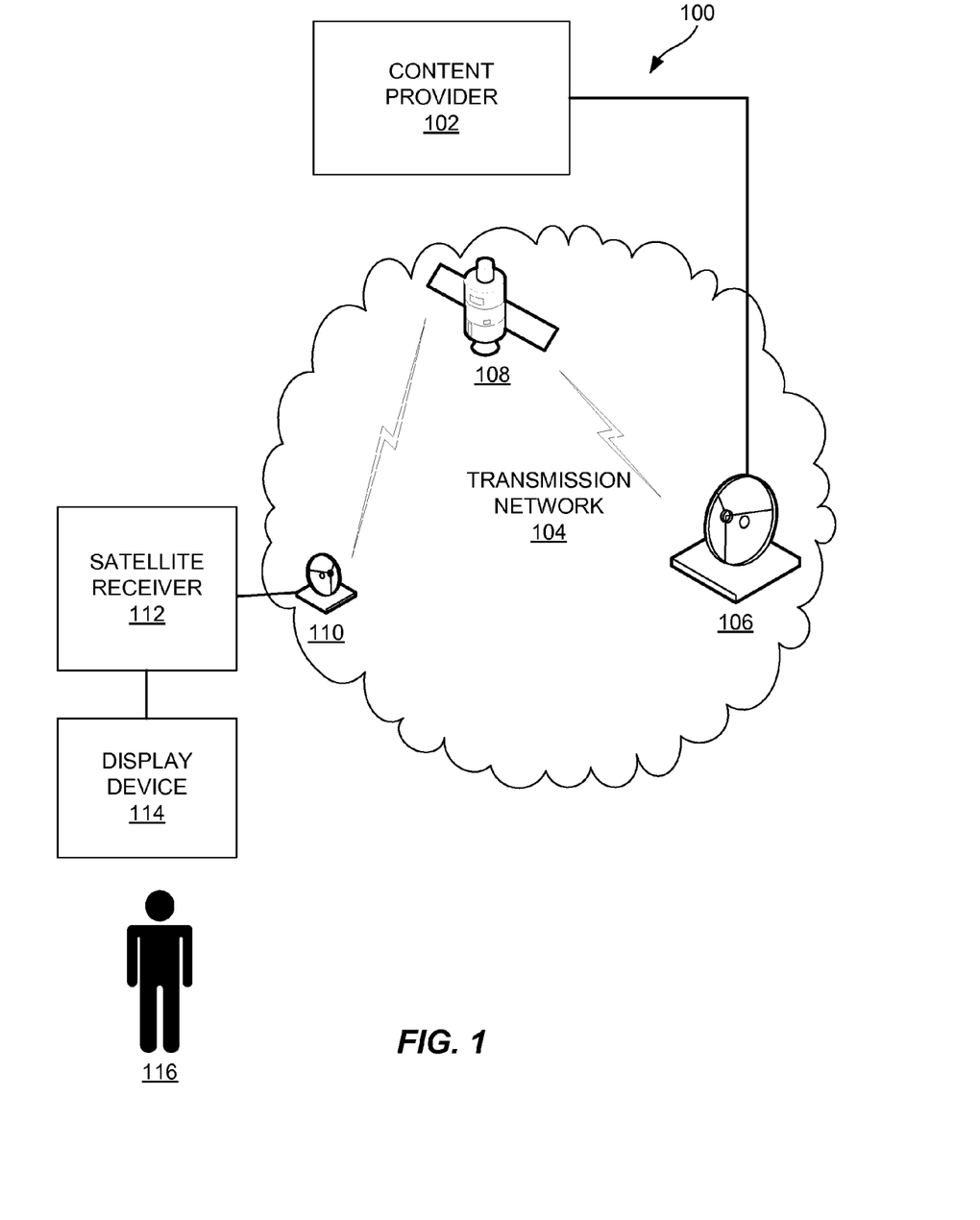
FIG. 1 illustrates an embodiment of a satellite broadcast system.

FIG. 1 illustrates an embodiment of a satellite broadcast system 100. The satellite broadcast system 100 includes a content provider 102, a transmission network 104, a satellite receiver 112 and a display device 114. The transmission network 104 includes an uplink system 106, a satellite 108 and a satellite antenna 110. Each of these components will be discussed in greater detail below. The satellite broadcast system 100 may include other elements, components or devices not illustrated for the sake of brevity.

Satellite broadcast system 100 includes a content provider 102 in signal communication with an uplink system 106 of a transmission network 104. The content provider 102 provides the uplink system 106 with television programs that are transmitted to the satellite receiver 112 for viewing by the user 116 on the display device 114. More particularly, the satellite broadcast system 100 comprises a satellite 108 in signal communication with the uplink system 106. The satellite 108 broadcasts television programs received from the uplink system 106. A satellite antenna 110 receives the television program broadcast from the satellite 108 through a wireless communication link. The satellite antenna 110 is in signal communication with the satellite receiver 112 and provides the satellite receiver 112 with the received television program. The broadcast television program content is received by the satellite receiver 112, processed and output for presentation by the display device 114 for viewing by the user 116.

In at least one embodiment, the satellite antenna 110 includes a satellite antenna reflector that collects signals and reflects the signals into a low noise block (LNB) downconverter or low noise block feedhorn (LNBF) downconverter. The LNB receives the signals, down converts the signals and transmits the signals to the satellite receiver 112 for further processing. The satellite receiver 112 then processes the signal to extract selected programming for output to the display device 114. This configuration of the satellite antenna 110 is often referred to as a "satellite dish", "dish antenna" or "outdoor unit (ODU)". However, it is also to be appreciated that the satellite antenna 110 may be another type of antenna configuration, such as a phase array antenna, depending on desired design criteria.

In at least one embodiment, the satellite antenna 110 may be configured to receive signals from multiple transponders. For example, many Ku band satellites transmit information through 32 transponders, each at a different frequency. In some cases, the satellite antenna 110 may receive signals from transponders on multiple satellites at different orbital locations. For example, the satellite antenna 110 may be orientated to receive signals from a first satellite 108 located at orbital position 110° and from a second satellite 108 located at orbital position 119°.

Each transponder signal may include one or more programs or other sets of data within the signal, such as electronic programming guide data, software updates and the like. In some embodiments, transponder signals may have different signal strengths depending on the transmission output power of each transponder. For example, two transponders may vary in their output power by +/−1 dB depending on the configuration of the transponders. Further, the transponder signals may vary over time as the output power of the transponder signal is reconfigured depending on desired design and operational criteria.

The satellite receiver 112 is configured to record signal strengths of received signals periodically and determine whether a drop in the signal strength has occurred over a relevant time period. For example, when the user 116 first tunes to a channel, the satellite receiver 112 may store the signal strength of the associated transponder signal. As the satellite receiver 112 continues to receive the transponder signal containing the television program, the satellite receiver 112 may periodically sample the signal strength. The stored signal strengths may be compared with the initial signal strength value and/or other signal strength values to determine whether the signal strength has changed over time.

If the signal strength decreases over time, then the satellite receiver 112 may process the resulting signal strength decrease to identify a possible reason for the signal drop. For example, the satellite receiver 112 may identify that the signal strength decrease is greater than a specified decision value and determine that a storm is approaching/crossing the line of sight between the satellite 108 and the satellite antenna 110. Thus, if the signal lock is lost by the satellite receiver 112 shortly thereafter, then the satellite receiver 112 may provide a message to the user 116 regarding the signal loss and may further specify the likely reason for the signal loss, e.g., rain or other precipitation. Thus, the user 116 realizes that the signal loss is caused by a temporary weather condition and may wait for the weather to pass over rather than calling the satellite television provider to inquire about the outage.

Figure 2:
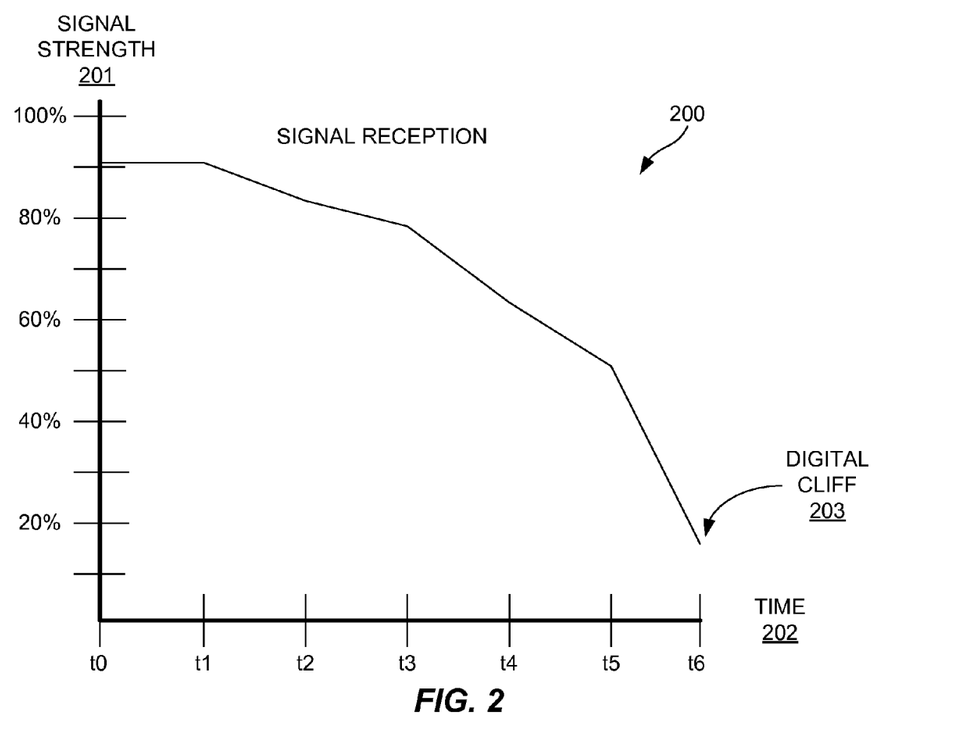
FIG. 2 illustrates a graph of an embodiment of signal reception by a satellite receiver.

FIG. 2 illustrates a graph 200 of an embodiment of signal reception by a satellite receiver 112. More particularly, the graph 200 illustrates the relationship between signal strength values and time for the example specified in Table #1. The vertical axis illustrates the signal strength 201 and the horizontal axis illustrates various times 202. The signal strengths 201 illustrated in the graph 200 are normalized. However, it is to be appreciated that absolute values of the signal strength 201 may also be utilized depending on desired design criteria.

With a digital signal, the user 116 will not experience much difference in picture quality until the signal strength 201 approaches the digital cliff 203 illustrated in the graph 200. In other words, unlike an analog television signal, the signal quality of the digital signal does not become snowy or degrade as the signal strength decreases. However, as the signal strength decreases, the probability of reception of the signal decreases accordingly. At the digital cliff 203, the satellite receiver 112 is unable to continue receiving the digital television signal. In the illustrated example, the digital cliff 203 occurs at approximately 15% of the maximum available signal strength. However, it is to be appreciated that other normalized values for the digital cliff 203 may be utilized depending on the configuration of the broadcast system. Near the digital cliff 203, the picture may become pixilated and at the digital cliff 203, the satellite receiver 112 will completely lose reception of the signal transmitted by satellite 108. Thus, the satellite receiver 112 will be unable to output content to the display device 114 when the strength 201 of the received signal is below the digital cliff 203. While graph 200 illustrates signal degradation over time 202, it is to be appreciated that the digital cliff 203 may occur at anytime depending on a various conditions which negatively impact the signal strength 201.

As described above, the satellite receiver 112 is configured to determine signal strength differences occurring over time. These signal strength differences may be utilized to identify the source of signal loss. For example, an instantaneous signal drop from 60% to 0% is likely caused by a physical obstruction or misalignment of the satellite antenna 110. On the other hand, a signal strength drop from 60% to 20% in a span of several minutes may be caused by rain fade interfering with the signal received by the satellite antenna 110. Thus, in at least one embodiment, the satellite receiver 112 is configured to measure a decrease in the signal strength over a relevant period of time to determine whether the drop is greater than a specified decision value. For example, a drop from a signal strength of 60% to 30% within a 5 minute time period may be utilized to indicate degradation caused by rain fade.

In another embodiment, a drop by a specified signal strength within a relevant time period (e.g., several minutes) may indicate degradation caused by rain fade. For example, if the signal strength is initially in a normal range (e.g., 40% to 70%) and the signal strength drops to 20% within the relevant time period, then the cause of the signal strength drop may be identified by the satellite receiver 112 as rain fade or other weather conditions. Thus, in at least one embodiment, the satellite receiver 112 identifies a loss of the signal lock (e.g., beyond the digital cliff) and checks the previously recorded signal strengths to determine whether a drop in signal strength by at least a specified decision value occurred within a previous periodic interval. If the specified drop in the signal strength occurred within the previous periodic interval, then the satellite receiver 112 outputs for presentation by the display device 114 a message regarding the rain fade loss of the signal.

In at least one embodiment, the satellite receiver 112 may utilize a value corresponding to a specified signal strength gradient (e.g., a signal strength loss per unit time) rather than a straight signal strength loss to identify signal degradation caused by various conditions, such as weather. For example, a value of 3-4 dB/min signal strength decrease may identify a storm approaching that may cause a loss of the signal by the satellite receiver 112. If the satellite receiver 112 detects a signal strength gradient between two or more recorded values of the signal strength that is greater than a specified decision value, then the satellite receiver 112 may identify rain fade as a possible cause of the signal degradation. The satellite receiver 112 may then inform the user 116 accordingly if a signal is lost by the satellite receiver 112. Thus, the user 116 will be less likely to call customer support, as the satellite receiver 110 may inform the user 116 that the rain fade condition will disappear shortly once the storm passes over.

Figure 3:
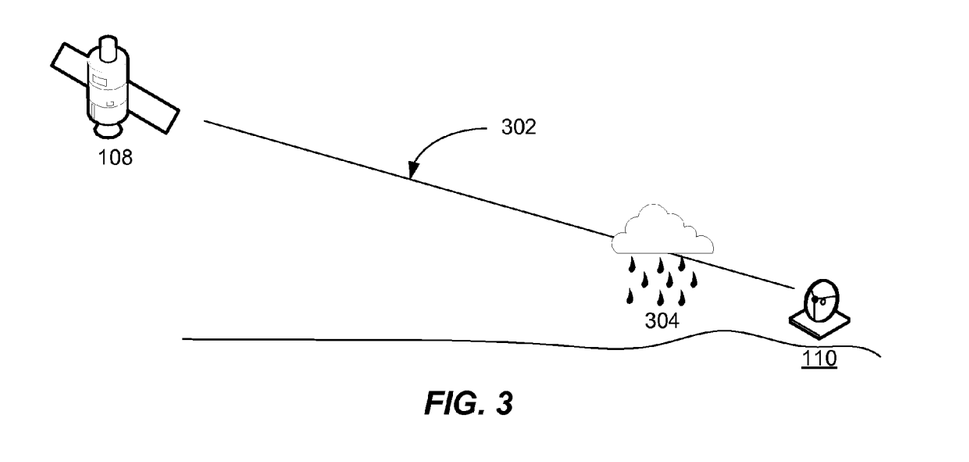
FIG. 3 illustrates an embodiment of the line of sight between the satellite antenna and the satellite.

In some circumstances, there may not be rain in the vicinity of the satellite antenna 110, but the rain may nonetheless interfere with the signal received by the satellite antenna. FIG. 3 illustrates an embodiment of the line of sight 302 between the satellite antenna 110 and the satellite 108. In FIG. 3, the line of sight 302 between the satellite 108 and the satellite antenna 110 is not drawn to scale. In the typical configuration, the satellite 108 is positioned near the equator at approximately 22,000 miles above the Earth's surface. The satellite antenna 110 is positioned to have a direct line of sight 302 with the satellite 108 and a satellite signal is transmitted along the line of sight 302 from the satellite 108 to the satellite antenna 110. Rain fade of the signal may be experienced in a vertical area of approximately 5-10 km above the surface of the Earth, which means that rain 304 several miles away could interfere with the signal received by the satellite antenna 110. Thus, the user 116 may experience rain fade at their satellite receiver 112 even though it is not physically raining at the location of the satellite receiver 112. Advantageously, the satellite receiver 112, enhanced in accordance with the techniques described herein, informs the user 116 regarding the rain fade condition such that the user 116 does not call customer support regarding a temporary outage.

Figure 4:
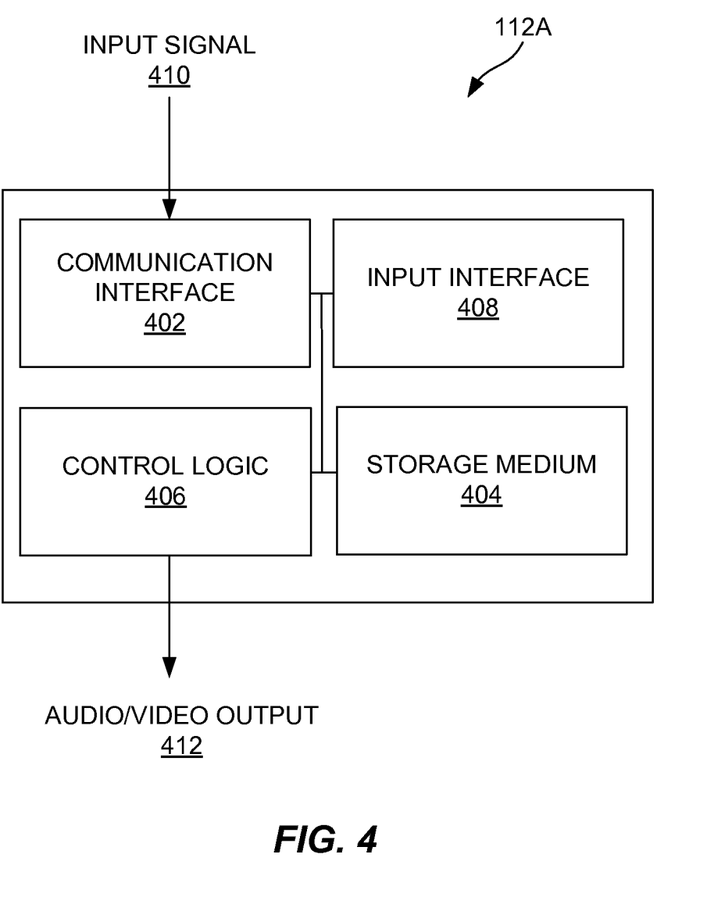
FIG. 4 illustrates an embodiment of a satellite receiver of FIG. 1.

FIG. 4 illustrates an embodiment of a satellite receiver of FIG. 1. FIG. 4 will be discussed in reference to the satellite broadcast system 100 illustrated in FIG. 1. The satellite receiver 112A includes a communication interface 402, a storage medium 404, control logic 406 and an input interface 408. Each of these components will be discussed in greater detail below. The satellite receiver 112A may include other elements, components or devices which are not illustrated for the sake of brevity.

The communication interface 402 is operable to receive an input signal 410 from the satellite antenna 110 (see FIG. 1). More particularly, in at least one embodiment, the communication interface 402 receives and tunes a television signal including television programming from the input signal 410. The input signal 410 may correspond with a single transponder signal or multiple transponder signals from the satellite 108. In at least one embodiment, the communication interface 402 may comprise multiple tuners, utilized by the satellite receiver 112A to output and/or record multiple television programs simultaneously.

The storage medium 404 is operable to store settings and other data of the of the satellite receiver 112A, such as recorded television programming. In at least one embodiment, the storage medium 404 is operable to store data regarding strengths of signals received by the communication interface 402. If the satellite receiver 112A receives signals from multiple satellites, then multiple sets of signal strength data, each corresponding to a particular satellite, may be stored in the storage medium 404. The storage medium 404 may comprise any type of memory appropriate for storing data utilized to control the operation of the television receiver 102A. Exemplary embodiments of the storage medium 404 include semiconductor random access memory (RAM), flash memory, magnetic memory and the like. In some embodiments, the storage medium 404 may comprise any combination of the different types of storage mediums depending on desired design criteria.

The input interface 408 is operable to wirelessly receive data from a remote control (not shown in FIGS. 1 and 2). The input interface 408 may communicate with a remote control utilizing any type of IR or RF communication link. In at least one embodiment, the input interface 408 receives a key code from a remote control and responsively provides the key code to the control logic 406 for processing. In some embodiments, the input interface 408 may receive positional information from a scrolling device of a remote control, e.g., a touch pad, scroll wheel or the like. The data received from the remote control may be utilized by the control logic 406 to control the output of content by the control logic 406. Some of the data received by the input interface 408 may request to view particular channels, electronic programming guide data, menus and the like.

The control logic 406 is operable to control the operation of the satellite receiver 112A. The control logic 406 may be a single processing device or a plurality of processing devices that cooperatively operate to control the operation of the satellite receiver 112A. The control logic 406 may include or interact with various components or modules for processing and outputting audio/video content that are not explicitly described herein. Exemplary components or modules for processing audio/video content include a demodulator, a decoder, a decompressor, a conditional access module and a transcoder module.

The control logic 406 coordinates reception of the input signal 410 by the communication interface 402 and the processing of data contained therein. In at least one embodiment, the control logic 406 is operable to generate an audio/video output 412 based on the input signal 410, e.g., extract selected audio/video content for display by the associated display device 114. If the storage medium 404 is operable to persistently store received audio/video content for subsequent viewing, then the control logic 406 is also operable to retrieve stored video content from the storage medium 404 to generate the audio/video output 412 for display by the display device 114. The display device 114 then presents the audio/video output 412 to the user 116.

The control logic 406 may incorporate circuitry to output the audio/video streams in any format recognizable by the display device 114 including composite video, component video, Digital Visual Interface (DVI), High-Definition Multimedia Interface (HDMI), 1394 and WiFi. The control logic 406 may also incorporate circuitry to support multiple types of these or other audio/video formats. In at least one embodiment, the satellite receiver 112A may be integrated with the display device 114 and the control logic 406 may be operable to control the presentation of the audio/video output 412 by the display device 114. In some embodiments, the control logic 406 is further operable to output user interface menus and other information to allow the user 116 to view an electronic programming guide, set preferences of the satellite receiver 112, set recording timers, modify recording timers and the like In at least one embodiment, the control logic 406 is operable to determine signal strengths of a signal received by the communication interface 402 at various times. For example, the control logic 406 may determine a first signal strength of a received signal at a first time and may further determine a second signal strength of the signal at a second time. It is to be appreciated that the control logic 406 may determine and store any number of signal strengths at any number of times, depending on desired design criteria.

The stored signal strengths may be utilized to calculate a signal strength difference between the first signal strength and a second signal strength. In at least one embodiment, the signal strength difference may be computed as following:

$$SS_D = SS_1 - SS_2 \qquad \text{(Equation 1)}$$

Utilizing Equation 1, the satellite receiver 112 may determine whether the signal strength difference is greater than a specified decision value, the specified decision value indicating a possible cause of signal loss. If the signal strength difference is greater than the specified decision value, then the satellite receiver 112 may identify a possible cause of the decrease in the signal strength. In at least one embodiment, the control logic 406 then outputs for presentation a message responsive to determining that the signal strength difference is greater than the specified decision value. For example, the message may explain to a user 116 that the degradation of the signal is being caused by temporary weather conditions.

In at least one embodiment, the control logic 406 may further determine whether a time difference between the first time and the second time is less than a second decision value. Thus, the message may be outputted if both the signal strength difference is greater than the first decision value and the time difference is less than the second decision value. In other words, the message is provided to the user when the signal degradation that occurs is greater than a specified gradient value (e.g., signal strength difference per unit time is greater than a specified decision value).

In at least one embodiment, the control logic 406 may calculate a signal strength gradient between two or more values of recorded signal strengths. The specified decision value utilized by the control logic 406 for comparison may thus be specified as a signal strength differential per unit time. Therefore, the control logic 406 may take into account quick drops in signal strength caused by an approaching storm or other type of weather condition to identify sources of signal degradation.

The specified decision value and the time difference utilized by the control logic 406 for comparison may be determined based on desired design criteria. For example, it may be determined that a strength of a signal will decrease a specified decision value as a storm approaches. In at least one embodiment, the specified decision value is stored into the satellite receiver 112A at the time of manufacture. The comparison value may also be added or updated to the satellite receiver 112A subsequently during an update process.

It is to be appreciated that different comparison values may be specified for different types of signal degradation. In at least one embodiment, the control logic 406 is configured to learn the specified decision values utilized to identify various types of signal interference. For example, the control logic 406 may identify multiple temporary signal losses that were preceded by similar decreases in the strength of the received signal. Thus, the control logic 406 may determine that the decreases in the strength of the received signal identify a possible upcoming temporary outage and may utilize the identified signal strength gradient to identify future temporary outages caused by weather conditions.

Figure 5:
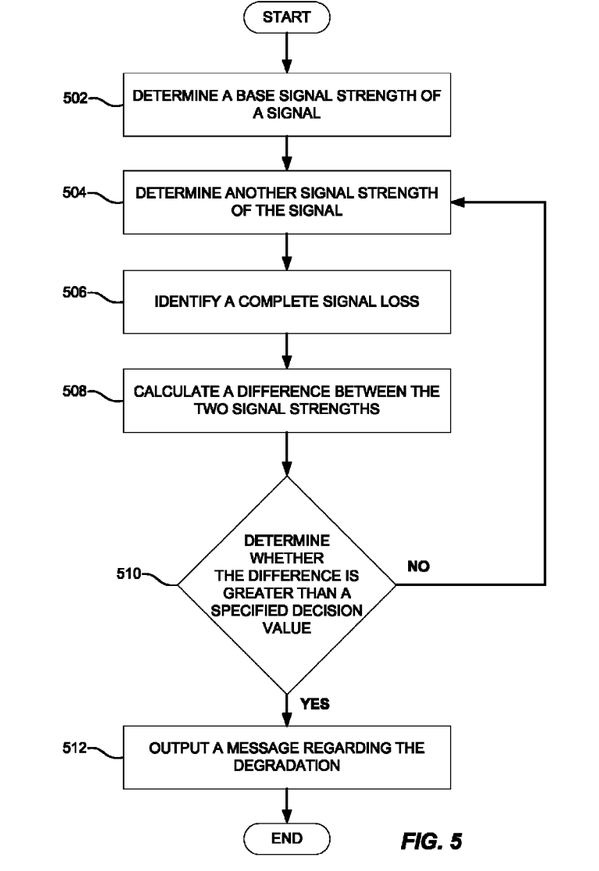
FIG. 5 illustrates a process for operating a television receiver.

FIG. 5 illustrates a process for operating a television receiver. More particularly, FIG. 5 illustrates a process for identifying signal degradation in a receiving device and determining the source of the signal degradation. The process of FIG. 5 may include other operations not illustrated for the sake of brevity.

The process includes determining a first signal strength of a signal received by a receiving device at a first time (operation 502). In at least one embodiment, the first signal strength may be sampled and stored when the signal is first locked onto by the receiving device. This provides a base value to compare against other signal strength values subsequently recorded by the receiving device. In at least one embodiment, a first signal strength may be resampled if the signal is retuned, e.g., the user changes channels.

The process further includes determining a second signal strength of a signal received by the receiving device at a second time (operation 504). The second signal strength may be sampled at any time after the first signal strength. In at least one embodiment, a receiving device may be configured to periodically sample the signal strength of the sample at specified intervals, e.g., every 600 ms.

The process further includes identifying a complete signal loss (operation 506). For example, the strength of the signal may decrease to a level such that the receiving device is unable to receive the signal.

The process further includes calculating a signal strength gradient between the first signal strength and the second signal strength (operation 508). The process includes determining whether the signal strength gradient is greater than a first decision value (operation 510). If the signal strength gradient is not greater than the first decision value, then the receiving device continues to resample additional instances of the second signal strength.

If the signal strength gradient is greater than the first decision value, then the method further includes outputting for presentation a message to the user, the message indicating to a user the degradation of the signal (operation 512).

Figure 6:
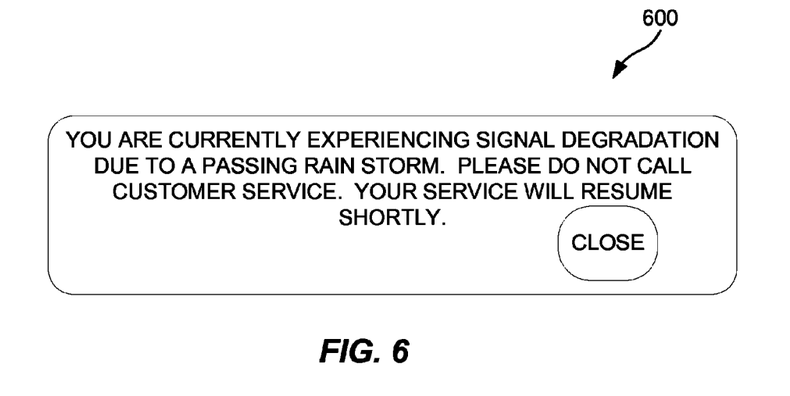
FIG. 6 illustrates an embodiment of a message provided to a user regarding signal loss caused by interference from a rain storm.

In at least one embodiment, the message is provided to the user before the signal is lost, warning the user that a signal loss due to weather conditions and/or other factors is possible in the future. Thus, operation 508 may be performed responsive to operation 504 without the performance of operation 506. In at least one embodiment, the message is provided after the signal is lost, informing the user of the reason for the signal loss. FIG. 6 illustrates an embodiment of a message 600 provided to a user regarding signal loss caused by interference from a rain storm.

In addition to outputting an appropriate message, such as message 600, a receiving device may execute other operations in association with identifying signal loss and/or signal degradation over time. For example, the receiving device may query a server to download weather maps, emergency alert information or other weather notifications. In at least one embodiment, the receiving device may download the weather alert information via an alternative communication path/medium. For example, a satellite television receiver may download weather information via a wired Ethernet link during periods of time when the satellite signal link is disrupted by weather. In at least one embodiment, the receiving device determines its location and queries the server for appropriate geographically related weather information. For example, a satellite receiver may utilize a look up table to convert its zip code into an emergency alert system (EAS) specific area message encoding (SAME) code.

Such alerts and weather information may be output in association with the message 600. In at least one embodiment, a receiving device outputs a weather map showing a trajectory of a storm that caused a signal outage at the receiving device. In some scenarios, a satellite television receiver may lose signal while the user is watching stored or internet accessible programming. Thus, the signal loss may not immediately impact the user and the user may not even be aware of the signal loss. However, it may be desirable to notify the user regarding the signal loss in the event that such signal loss is caused by approaching adverse weather conditions. For example, a satellite receiver may identify a signal loss caused by a storm associated with a tornado. The satellite receiver may query the internet for weather alerts related to the signal loss and may provide a tornado warning to the user as an overlay or the like while the user is watching the stored television content.

In at least one embodiment, a receiving device may be capable of receiving content from multiple sources, such as multiple satellites, the internet, stored content or communicatively coupled entertainment devices, such as media servers, personal computers and the like. Some television receivers present content from one or more source devices in an integrated content selection menu, such as an electronic programming guide. In accordance with techniques described herein, a receiving device may identify communication losses with various source devices and provide indication to a user regarding the temporary unavailability of associated content. For example, a satellite receiver that receives content from multiple satellites may grey out channels in an electronic programming guide which are temporarily unavailable due to communication problems with a single satellite. Thus, the user may choose to access content available from other satellites which are not impacted by current weather conditions. It is to be appreciated that other indicators, such as icons and the link may also be utilized in accordance with the techniques described herein.

Table #1 illustrates one embodiment of various carrier to noise ratios and associated signal strengths measured by an exemplary receiving device in accordance with the techniques described herein. As illustrated in Table #1, the carrier to noise ratio is 13 dB at time 0, e.g., when the receiving device initially tunes the signal. Take for example the situation where the receiving device is unable to lock onto a signal at below 5 dB. Thus, the signal is lost between times 5 and 6, when the signal strength is 2 dB. In the illustrated embodiment, the receiving device may be configured to determine a signal strength gradient that indicates the existence of rain fade or other weather conditions that may cause signal loss. For example, a signal strength decrease of 5 dB or more in a specified time interval may indicate possible rain fade occurring. Thus, the signal strength gradient between time 0 and time 5 may indicate possible rain fade. In one embodiment, a signal strength loss of 25% may indicate possible rain fade. Thus, the signal strength gradient between time 1 and time 4 may indicate possible rain fade occurring. The provided values are exemplary in detail and it is to be appreciated that different signal strength gradients may be utilized with the teachings described herein according to desired design criteria.

TABLE #1

Examples of Signal Strengths For A Received Signal

| Point | Time (Min) | Carrier To Noise | Signal Strength |
|---|---|---|---|
| 0 | 0 | 13 dB | 91% |
| 1 | 10 | 13 dB | 91% |
| 2 | 20 | 12 dB | 84% |
| 3 | 21 | 11 dB | 77% |
| 4 | 22 | 9 dB | 63% |
| 5 | 23 | 7 dB | 49% |
| 6 | 24 | 2 dB | 14% |

As described above, the teachings described herein may be utilized to detect conditions which may cause signal degradation over a longer period of time, e.g., weeks, months and the years. For example, trees may grow up in front of a satellite antenna, blocking the antenna's line of sight with the satellite and leading to signal loss/degradation at the satellite receiver. Thus, signal strength values may be recorded over a period of time and utilized to determine whether the signal is becoming degraded. Table #2 illustrates another embodiment of various carrier to noise ratios an associated signal strengths measured by an exemplary receiving device in accordance with the techniques described herein.

TABLE #2

Examples of Signal Strengths For A Received Signal

| Point | Time (Weeks) | Carrier To Noise | Signal Strength |
|---|---|---|---|
| 0 | 0 | 13 dB | 91% |
| 1 | 4 | 13 dB | 91% |
| 2 | 6 | 12 dB | 84% |
| 3 | 12 | 11 dB | 77% |
| 4 | 14 | 9 dB | 63% |

TABLE #2-continued

Examples of Signal Strengths For A Received Signal

| Point | Time (Weeks) | Carrier To Noise | Signal Strength |
|---|---|---|---|
| 5 | 15 | 7 dB | 49% |
| 6 | 16 | 2 dB | 14% |

In the illustrated embodiment, a receiving device may be configured to record a signal strength value during each receiving/viewing session. Periodically, these values are processed to identify signal degradation occurring over time. Thus, if signal degradation is occurring over time, then the receiving device may provide a message to the user regarding possible physical obstructions blocking the view of the satellite antenna. As illustrated in table #2, the carrier to noise ratio and associated signal strength slowly degrades over time as foliage grows in front of the satellite antenna. Thus, if the signal drops a specified amount, then the satellite receiver may warn the user to remove the foliage prior to loss of the signal.

Figure 7:
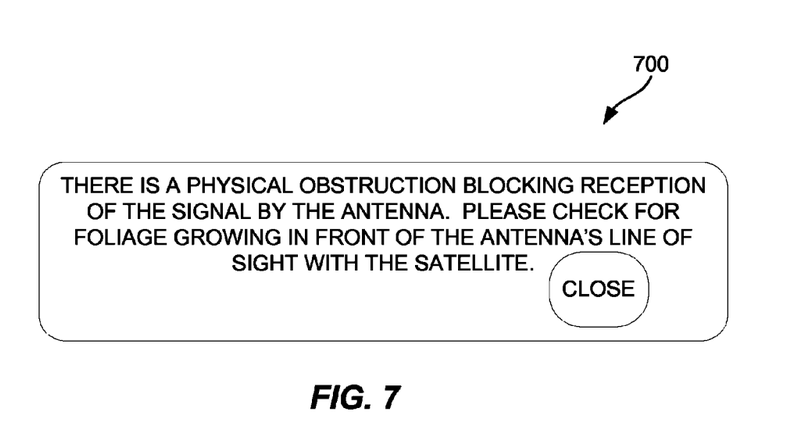
FIG. 7 illustrates an embodiment of a message presented to a user regarding possible physical obstructions blocking a satellite antenna's view of the satellite.

For example, signal loss may be expected below 20% signal strength (e.g., between points 5 and 6). Thus, it may be beneficial for the satellite receiver to warn the user about the signal degradation at point 4, giving the user ample time to remove the foliage prior to losing the signal. FIG. 7 illustrates an embodiment of a message 700 presented to a user regarding possible physical obstructions blocking a satellite antenna's view of the satellite. This proactive step makes it less likely that the satellite receiver will lose its signal because the user will be able to remove the foliage an adequate amount of time prior to when the signal would be lost. If the user loses the signal at time 6, then an appropriate message maybe displayed to the user regarding the cause of the signal loss such that the user can take appropriate steps to cure the same.

Although specific embodiments were described herein, the scope of the invention is not limited to those specific embodiments. The scope of the invention is defined by the following claims and any equivalents therein.

What is claimed:

1. A method for operating a receiving device, the method comprising:
recording over time a plurality of first signal strength values of a signal received by a receiving device;
recording over time a plurality of second signal strength values of the received signal;
calculating a signal strength gradient between first signal strength values and corresponding second signal values;
learning a set of decision values utilized to identify various types of signal interference, set of decision values based on previously associated causes of the various types of signal interference;
comparing a signal strength gradient value to a learned decision value; and
outputting for presentation a message responsive to the comparison of the signal strength gradient value to the learned decision value, the message indicating to a user a degradation of the signal and a possible cause of the degradation of the signal, the message further discouraging the user from contacting customer service.

2. The method of claim 1, further comprising:
identifying a signal loss condition of the signal;
wherein outputting for presentation the message is further performed responsive to identifying the signal loss, the output including a clickable icon.

3. The method of claim 1, further comprising:
determining whether a time difference between the first time and the second time is less than a second decision value;
wherein outputting for presentation the message is performed responsive to determining that the signal strength difference is greater than the first decision value and determining that the time difference is less than the second decision value.

4. The method of claim 1, wherein determining the first signal strength is performed responsive to initially receiving the received signal.

5. The method of claim 1, wherein the first time and the second time are within a single viewing session and wherein the message indicates the existence of signal degradation caused by weather conditions.

6. The method of claim 5, further comprising:
identifying the weather conditions based on the signal strength difference and an elapsed time between the first time and the second time;
querying a server to download weather information associated with the weather conditions; and
outputting for presentation to the user the weather information.

7. The method of claim 6, wherein the weather information comprises a weather map.

8. The method of claim 6, wherein the weather information comprises an emergency alert message.

9. The method of claim 5, further comprising:
identifying the weather conditions based on the signal strength difference and an elapsed time between the first time and the second time; and
outputting for presentation to the user a warning regarding the weather condition.

10. The method of claim 1, wherein an elapsed time between the first time and the second time is between multiple viewing sessions and wherein the message indicates the existence of signal degradation caused by a physical obstruction between an antenna associated with the receiving device and a transmitting device transmitting the signal.

11. The method of claim 10, wherein the physical obstruction comprises foliage growing in front of the antenna.

12. The method of claim 1, wherein the receiving device comprises a satellite receiver and the signal comprises a satellite signal.

13. A receiving device comprising:
a communication interface operable to receive a signal associated with a satellite based transmission; and
control logic operable to:
record a plurality of signal strength values of the signal over time;
calculate a signal strength gradient between the recorded plurality of signal strength values;
learn a plurality of decision values that identify various types of signal degradation, the plurality of decision values based on previous associations of signal degradation to causes of the signal degradation;
compare at least one signal strength difference to a learned first decision value; and
output for presentation a message responsive to comparing the at least one signal strength difference to the learned first decision value, the message indicating to a user a degradation of the signal and a possible cause of the degradation of the signal, the message further discouraging the user from contacting customer service.

14. The receiving device of claim 13, wherein the control logic is further operable to identify a signal loss condition of the signal and output the message responsive to identifying the signal loss condition.

15. The receiving device of claim 13, wherein the control logic is further operable to determine whether a time difference between the first time and the second time is less than a second decision value and output for presentation the message responsive to determining that the signal strength difference is greater than the first decision value and determining that the time difference is less than a second decision value.

16. The receiving device of claim 13, wherein the control logic is operable to determine the first signal strength responsive to initially receiving the received signal.

17. The receiving device of claim 13, wherein the first time and the second time are within a single viewing session and wherein the message indicates the existence of signal degradation caused by weather conditions.

18. The receiving device of claim 13, further comprising:
a storage medium operable to store recorded television content;
the control logic operable to output the recorded television content for presentation by a presentation device and output the message in association with the recorded television content.

19. The receiving device of claim 13, wherein an elapsed time between the first time and the second time is between multiple viewing sessions and wherein the message indicates the existence of signal degradation caused by a physical obstruction between an antenna associated with the receiving device and a transmitting device transmitting the signal.

20. The receiving device of claim 13, wherein the receiving device comprises a satellite receiver and the signal comprises a satellite signal.

21. A satellite receiver comprising:
a communication interface operable to receive a satellite signal and extract data from the satellite signal; and
control logic operable to:
measure a plurality of signal strengths of the signal over a period of time;
calculate a signal strength gradient between the plurality of signal strengths over the period of time;
identify a signal loss of the satellite signal;
learn a plurality of decision values, each decision value identifying a type of signal degradation, the set plurality of decision values based on associations of signal degradation to identified causes of the signal degradation;
determine whether the signal strength gradient is greater than at least one learned decision value; and
output for presentation a message responsive to determining that the signal strength gradient is greater than the at least one learned decision value, the message indicating to a user a degradation of the signal and a possible cause of the degradation of the signal, the message further discouraging the user from contacting customer service.

22. The satellite receiver of claim 21, wherein a first of the plurality of signal strengths is measured responsive to the communication interface locking onto the received signal.

23. The satellite receiver of claim 21, wherein the period of time is within a single viewing session and wherein the message indicates the existence of signal degradation caused by weather conditions.

24. The satellite receiver of claim 21, wherein the period of time spans multiple viewing sessions and wherein the message indicates the existence of signal degradation caused by a physical obstruction between an antenna associated with the satellite receiver and a satellite transmitting the signal.

25. The satellite receiver of claim 21, wherein the communication interface is operable to receive television programming from first and second satellites, the first satellite signal is associated with a first satellite, the control logic is operable to generate an electronic programming guide identifying programming receivable from the first the second satellites, the electronic programming guide including an indicator regarding the temporary unavailability of a first portion of the television programming receivable from the first satellite.

* * * * *